UNITED STATES PATENT OFFICE.

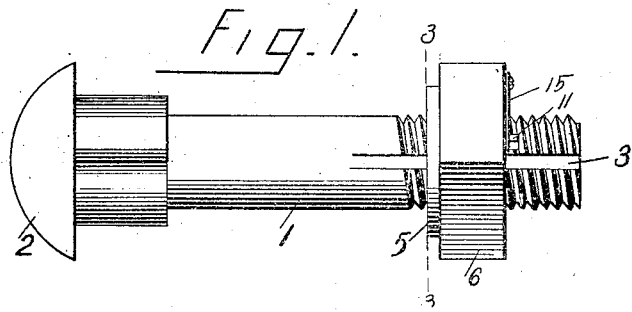
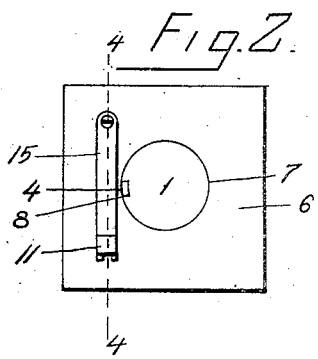
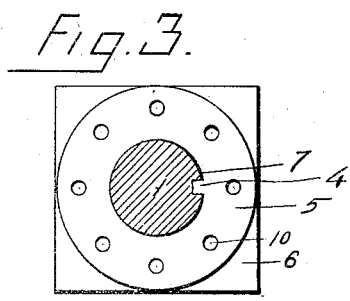
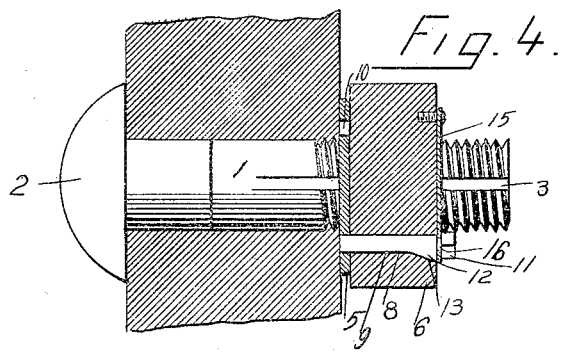
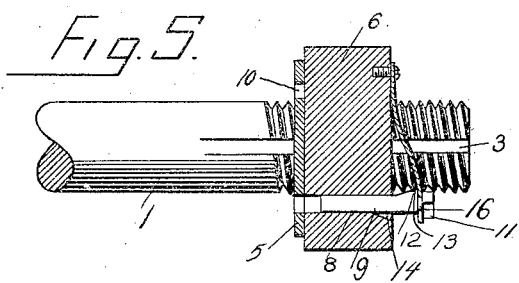

OLIVER R. MANNON AND HANS C. RASMUSSEN, OF MAXWELL, NEBRASKA.

NUT AND BOLT LOCK.

1,033,027. Specification of Letters Patent. Patented July 16, 1912.

Application filed August 12, 1911. Serial No. 643,773.

*To all whom it may concern:*

Be it known that we, OLIVER R. MANNON and HANS C. RASMUSSEN, citizens of the United States, residing at Maxwell, in the county of Lincoln and State of Nebraska, have invented new and useful Improvements in Nut and Bolt Locks, of which the following is a specification.

This invention relates to nut and bolt locks, and has for an object to provide means for positively holding the nut against retrograde movement, the said means being movably mounted on the nut and being adapted to adjustment whereby it can be readily moved to an inoperative position so as to permit the effective adjustment of the nut on the bolt and which also permits the same to be readily removed therefrom, when desired.

In the drawings, forming a part of this application, and in which like numerals of reference designate corresponding parts in the several views: Figure 1 is a side view of the nut lock. Fig. 2 is an end view thereof. Fig. 3 is a section on line 3—3 of Fig. 1. Fig. 4 is a section on line 4—4 of Fig. 2. Fig. 5 is a section on line 4—4 of Fig. 2, showing the locking element in a released position.

My improved nut lock comprises a bolt 1 which is provided at one end with the usual head 2. The threaded shank portion of the bolt has formed therein a longitudinal slot 3 which slidably receives the locking tongue 4 on the washer plate 5. This construction is such that when the tongue is engaged in the slot as described, the washer plate will be securely held against rotation. The slot 3 opens at its outer end onto the outer end of the bolt so as to permit of the removal of the washer plate from or the engagement of the same with the bolt.

The nut 6, shown herein, is provided with the usual threaded bore 7 to receive the threaded shank of the bolt. The passage 8 extends through the nut and is arranged in parallel relation to the bore 7, and as shown, it has slidably fitted therein a locking element 9 whose inner end is adapted to be extended into one of the concentric series of passages 10 in the washer plate 5. A squared head 11 is formed on the outer end of the locking element, and is designed for the reception of a wrench or suitable tool whereby the element can be readily rotated for a purpose to be hereinafter described. Adjacent to the head 11, the locking element is provided with a keeper portion 12 which is substantially of V configuration, being increased in diameter in the direction of the head so as to provide an inclined locking surface 13 which is adapted for engagement with the outer walls of the passage 8 so as to hold the locking element in a released position. The outer end of the passage 8 is of an increased diameter as shown at 14 so as to receive the keeper portion 12, and to permit the inner end of the locking element to be extended beyond the inner surface of the nut 6 for positive interchangeable locking engagement in the passage 10 in the washer plate. A leaf spring 15 is secured at one end to the nut 6, and is shown at the opposite end of the spring as forked, the arms of which being extended into the annular groove 16 in the locking element, the said groove being positioned between the keeper portion 12 and the head 11, respectively, the forked portion of the spring bearing against the outer portion of the locking element 9 so as to normally hold the locking element under tension.

In operation, the bolt is extended through the object to which it is to be secured, and the washer plate is extended onto the threaded portion of the bolt as clearly shown in the drawings. Before the nut is applied to the bolt, the locking element 9 is adjusted so that the locking surface 3 will hold the inner end of the element 9 within the passage 8 as shown in Fig. 5 of the drawings. The nut is applied to the bolt and moved in the direction of the washer plate. After the desired adjustment of the nut has been obtained, the locking element is rotated manually so as to disengage the locking surface 13 from the outer walls of the passage 8. Under the influence of the leaf spring 15, the locking element will then be moved longitudinally in the passage 8 and the inner end of the element will become operatively engaged in one of the passages 10, securely holding the nut against retrograde movement as will be readily understood.

Having thus fully described the said invention, what we claim is:—

A nut lock including a bolt having a washer plate adjustable longitudinally thereon, a nut adjustably mounted on the bolt, the said nut having a passage therein disposed parallel to the axial line of the bolt, the said passage having one of its walls formed with an upwardly and outwardly inclined portion forming a recess in the outer face thereof, a sliding locking key mounted in the passage, said key having one of its vertical walls at an intermediate portion outwardly and inwardly inclined and conforming in configuration with the said upwardly and outwardly inclined portion of said recess, an enlarged head formed on the outer end of said key, said key being provided with a reduced portion disposed between the outer portion of the said outwardly and upwardly inclined portion of the key and said enlarged head, a spring provided with a fork-shaped end secured to the outer face of said nut and having its forked end positioned on said reduced portion of the key.

In testimony whereof we affix our signatures in presence of two witnesses.

OLIVER R. MANNON.
HANS C. RASMUSSEN.

Witnesses:
E. M. VIN ZANT,
A. F. MANNON.